US010622905B2

(12) United States Patent
Miyazaki (10) Patent No.: US 10,622,905 B2
(45) Date of Patent: Apr. 14, 2020

(54) DC-DC CONVERTER

(71) Applicant: SHARP KABUSHIKI KAISHA, Sakai, Osaka (JP)

(72) Inventor: Takaharu Miyazaki, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/505,603

(22) Filed: Jul. 8, 2019

(65) Prior Publication Data

US 2020/0021198 A1 Jan. 16, 2020

Related U.S. Application Data

(60) Provisional application No. 62/695,942, filed on Jul. 10, 2018.

(51) Int. Cl.
*H02M 3/335* (2006.01)
*H02M 1/00* (2006.01)

(52) U.S. Cl.
CPC ... *H02M 3/33569* (2013.01); *H02M 3/33546* (2013.01); *H02M 3/33576* (2013.01); *H02M 3/33584* (2013.01); *H02M 2001/0048* (2013.01)

(58) Field of Classification Search
CPC . H02M 3/335–33546; H02M 3/33569–33592; H02M 2001/0048–0058
See application file for complete search history.

(56) References Cited

U.S. PATENT DOCUMENTS

| 9,685,877 | B2 * | 6/2017 | Miura | H02M 3/33561 |
|---|---|---|---|---|
| 2014/0254209 | A1 * | 9/2014 | Takagi | H02M 3/33546 363/21.04 |
| 2014/0334189 | A1 * | 11/2014 | Yan | H02M 3/33584 363/17 |
| 2015/0124490 | A1 * | 5/2015 | Sanuki | H02M 3/33546 363/17 |
| 2017/0358996 | A1 * | 12/2017 | Higaki | H02M 1/083 |
| 2019/0157979 | A1 * | 5/2019 | Higaki | H02M 1/083 |
| 2019/0288606 | A1 * | 9/2019 | Higaki | H02M 3/33546 |

FOREIGN PATENT DOCUMENTS

| JP | 2014-087134 A | 5/2014 | |
|---|---|---|---|
| JP | 5762617 B2 * | 8/2015 | ........ H02M 3/33584 |

OTHER PUBLICATIONS

Katsuya Hirachi, "DAB method Bidirectional DC/DC converter", Hirachi laboratory technical memo No. 20140310 <URL: http://hirachi.cocolog-nifty.com/kh/files/20140310-1.pdf>.

\* cited by examiner

*Primary Examiner* — Gustavo A Rosario-Benitez
(74) *Attorney, Agent, or Firm* — ScienBiziP, P.C.

(57) ABSTRACT

[Object] To realize a DC-DC converter that can reduce switching loss when zero voltage switching is not achieved.

[Solution] When starting second control in conjunction with first control, a control unit (10) performs reduction of predetermined phase difference and increase of phase offset at the same time. A smallest value of output power of the DC-DC converter (CON1) performing reduction of the predetermined phase difference is lower than power at which a primary-side reactor (6) is saturated by current flowing through the primary-side reactor (6) under the first control and lower than power at which a secondary-side reactor (7) is saturated by current flowing through the secondary-side reactor (7) under the first control, at a desired output voltage under the first control.

3 Claims, 9 Drawing Sheets

DC-DC CONVERTER

TECHNICAL FIELD

The present invention relates to a DC-DC converter.

BACKGROUND ART

PTL 1 and NPL 1 disclose a DAB (Dual Active Bridge) DC-DC converter.

CITATION LIST

Patent Literature

[PTL 1] Japanese Unexamined Patent Application Publication No. 2014-87134

Non Patent Literature

[NPL 1] Katsuya Hirachi, "Hirachi Lab Technical Memo No. 20140310 DAB DC-DC Converter, Mar. 10, 2014, National Institute of Technology, Maizuru College [Searched Apr. 18, 2017] Internet <URL: http://hirachi-.cocolog-nifty.com/kh/files/20140310-1.pdf>

SUMMARY OF INVENTION

Technical Problem

In the DC-DC converters disclosed in PTL 1 and NPL 1, high potential voltage is applied to switching devices where zero voltage switching is not achieved. Accordingly, a problem occurs in the DC-DC converters disclosed in PTL 1 and NPL 1, in that switching loss is great.

It is an object of an aspect of the present invention to realize a DC-DC converter where switching loss, when zero voltage switching is unachieved, can be reduced.

Solution to Problem (1) An embodiment of the present invention is a DC-DC converter including: a primary-side converter including a primary-side reactor, a plurality of primary-side semiconductor switching devices, and a plurality of primary-side capacitors respectively connected in parallel to the plurality of primary-side semiconductor switching devices; a transformer having a primary winding and a secondary winding; a secondary-side converter including a secondary-side reactor, a plurality of secondary-side semiconductor switching devices, and a plurality of secondary-side capacitors respectively connected in parallel to the plurality of secondary-side semiconductor switching devices; and a control unit that controls the plurality of primary-side semiconductor switching devices and the plurality of secondary-side semiconductor switching devices. The primary-side reactor includes at least one of (1) a coil connected to the primary winding and (2) leakage inductance of the primary winding. The secondary-side reactor includes at least one of (A) a coil connected to the secondary winding and (B) leakage inductance of the secondary winding. The primary-side converter and the secondary-side converter each have a full bridge circuit. When performing a first control of outputting a first output power from the secondary-side converter, the control unit performs switching control where the primary-side semiconductor switching device located at an upper side of a first arm of the primary-side converter and the primary-side semiconductor switching device located at a lower side of a second arm of the primary-side converter match in terms of an on period, performs switching control where the primary-side semiconductor switching device located at the lower side of the first arm of the primary-side converter and the primary-side semiconductor switching device located at the upper side of the second arm of the primary-side converter match in terms of the on period, does not perform switching control of two switching devices located at one of the upper side of first and second arms, and the lower side of the first and second arms, of the secondary-side converter, performs switching control where one of the two secondary-side semiconductor switching devices located at another of the upper side of the first and second arms and the lower side of the first and second arms of the secondary-side converter, and the primary-side semiconductor switching device located at the upper side of the first arm of the primary-side converter and the primary-side semiconductor switching device located at the lower side of the second arm of the primary-side converter, match in terms of the on period, performs switching control where another of the two secondary-side semiconductor switching devices located at another of the upper side of the first and second arms and the lower side of the first and second arms of the secondary-side converter, and the primary-side semiconductor switching device located at the lower side of the first arm of the primary-side converter and the primary-side semiconductor switching device located at the upper side of the second arm of the primary-side converter, match in terms of the on period, and performs switching where the primary-side semiconductor switching device located at the upper side of the first arm of the primary-side converter and the primary-side semiconductor switching device located at the lower side of the first arm of the primary-side converter are switched at a predetermined phase difference. The predetermined phase difference is an offset from 180 degrees by an angle corresponding to approximately ¼ the inverse of resonance frequency. The resonance frequency is determined by the primary-side reactor and the primary-side capacitors. The first output power output from the secondary-side converter is adjusted by changing on-duty of each switching control performed. When performing a second control, the control unit performs switching control where the primary-side semiconductor switching device located at the upper side of the first arm of the primary-side converter and the primary-side semiconductor switching device located at the lower side of the second arm of the primary-side converter match in terms of the on period, performs switching control where the primary-side semiconductor switching device located at the lower side of the first arm of the primary-side converter and the primary-side semiconductor switching device located at the upper side of the second arm of the primary-side converter match in terms of the on period, does not perform switching control of two switching devices located at one of the upper side of the first and second arms, and the lower side of the first and second arms, of the secondary-side converter, performs switching control where the two secondary-side semiconductor switching devices located at another of the upper side of the first and second arms and the lower side of the first and second arms of the secondary-side converter, and the four primary-side semiconductor switching devices of the primary-side converter, are offset in phase in terms of the on period, and adjusts second output power output from the secondary-side converter by the phase offset, with on-duty in each switching control performed being approximately 50%. When starting the second control in conjunction with the first control, the control unit performs reduction of the predetermined phase difference and increase of the phase offset at the same time. A smallest value of output power of the DC-DC converter performing reduction of the predetermined phase difference is lower than power at which the primary-side reactor is saturated by current flowing through the primary-side reactor under the first control and lower than power at which the secondary-side reactor is saturated by current flowing through the secondary-side reactor under the first control, at a desired output voltage under the first control.

(2) Also, an embodiment of present invention is a DC-DC converter where, in addition to the configuration of the above-described (1), the two switching device located at one of the upper side of the first and second arms and the lower side of the first and second arms of the secondary-side converter are the secondary-side semiconductor switching devices, and power transmission from the primary-side converter to the secondary-side converter is switched to power transmission from the secondary-side converter to the primary-side converter, by directly switching from the first control to control where control of the primary-side converter and control of the secondary-side converter in the first control are interchanged.

(3) Also, an embodiment of present invention is a DC-DC converter where, in addition to the configuration of the above-described (1) or (2), when the on-duty of each switching control executed in the first control reaches approximately 50%, the second control is started in conjunction with the first control.

Advantageous Effects of Invention

According to an aspect of the present invention, a DC-DC converter can be realized where switching loss, when zero voltage switching is unachieved, can be reduced.

Additionally, according to an aspect of the present invention, disturbance in output current waveforms at a low output voltage band and occurrence of noise can be suppressed, and further, reduced costs can be realized.

DESCRIPTION OF EMBODIMENTS

[Reference Form]

Figure 1:
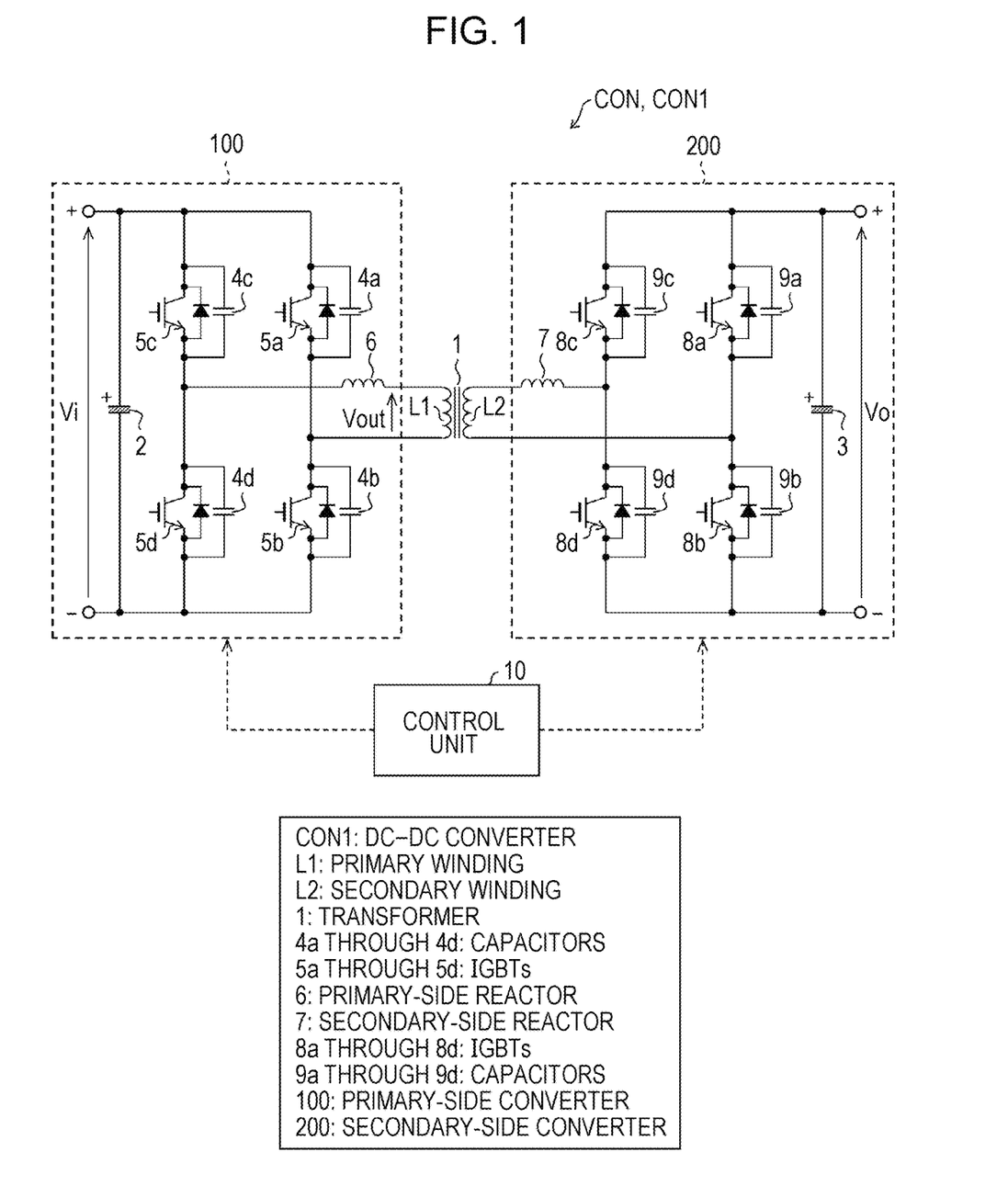
FIG. 1 is a circuit diagram of a DC-DC converter according to a reference form and embodiments of the present invention.

FIG. 1 is a circuit diagram of a DC-DC converter CON according to a reference form of the present invention. The DC-DC converter CON has a transformer 1, a primary-side converter 100, a secondary-side converter 200, and a control unit 10. The primary-side converter 100 is connected to a primary winding L1 of the transformer 1. The secondary-side converter 200 is connected to a secondary winding L2 of the transformer 1.

The primary-side converter 100 includes a full bridge circuit that has a capacitor 2, capacitors (primary-side capacitors) 4a through 4d, IGBTs (Insulated Gate Bipolar Transistors) (primary-side semiconductor switching devices) 5a through 5d, and a primary-side reactor 6. A diode is connected in parallel in the opposite direction to each of the IGBTs 5a through 5d. The capacitors 4a through 4d are connected in parallel to the IGBTs 5a through 5d, respectively. The IGBT 5a and IGBT 5b are connected serially, the collector of the IGBT 5a and the positive side of the capacitor 2 are connected, and the emitter of the IGBT 5b and the negative side of the capacitor 2 are connected. The IGBT 5c and IGBT 5d are connected serially, the collector of the IGBT 5c and the positive side of the capacitor 2 are connected, and the emitter of the IGBT 5d and the negative side of the capacitor 2 are connected. A node between the IGBT 5c and IGBT 5d is connected to one end of the primary winding L1 via the primary-side reactor 6. A node between the IGBT 5a and IGBT 5b is connected to the other end of the primary winding L1.

The primary-side reactor 6 may be a coil connected to the primary winding L1, or may be leakage inductance of the primary winding L1, or may include both of these.

The secondary-side converter 200 includes a full bridge circuit that has a capacitor 3, capacitors (secondary-side capacitors) 9a through 9d, IGBTs (secondary-side semiconductor switching devices) 8a through 8d, and a secondary-side reactor 7. A diode is connected in parallel in the opposite direction to each of the IGBTs 8a through 8d.

The capacitors 9a through 9d are connected in parallel to the IGBTs 8a through 8d, respectively. The IGBT 8a and IGBT 8b are connected serially, the collector of the IGBT 8a and the positive side of the capacitor 3 are connected, and the emitter of the IGBT 8b and the negative side of the capacitor 3 are connected. The IGBT 8c and IGBT 8d are connected serially, the collector of the IGBT 8c and the positive side of the capacitor 3 are connected, and the emitter of the IGBT 8d and the negative side of the capacitor 3 are connected. A node between the IGBT 8c and IGBT 8d is connected to one end of the secondary winding L2 via the secondary-side reactor 7. A node between the IGBT 8a and IGBT 8b is connected to the other end of the secondary winding L2.

The secondary-side reactor 7 may be a coil connected to the secondary winding L2, or may be leakage inductance of the secondary winding L2, or may include both of these.

Voltage Vi indicates input voltage to the DC-DC converter CON, and voltage Vo indicates output voltage from the DC-DC converter CON. Voltage Vout is output voltage of the primary-side converter 100.

The control unit 10 supplies gate signals to each of the IGBTs 5a through 5d and 8a through 8d, thereby controlling on/off of the IGBTs 5a through 5d and 8a through 8d. The control unit 10 performs switching control of each of the IGBTs 5a through 5d and 8b and 8d, sets the IGBTs 8a and 8c to an off state, and changes the on-duty of the IGBTs 5a through 5d and 8b and 8d. Thus, the control unit 10 performs first control where a first output power output from the secondary-side converter 200 is adjusted.

Figure 2:
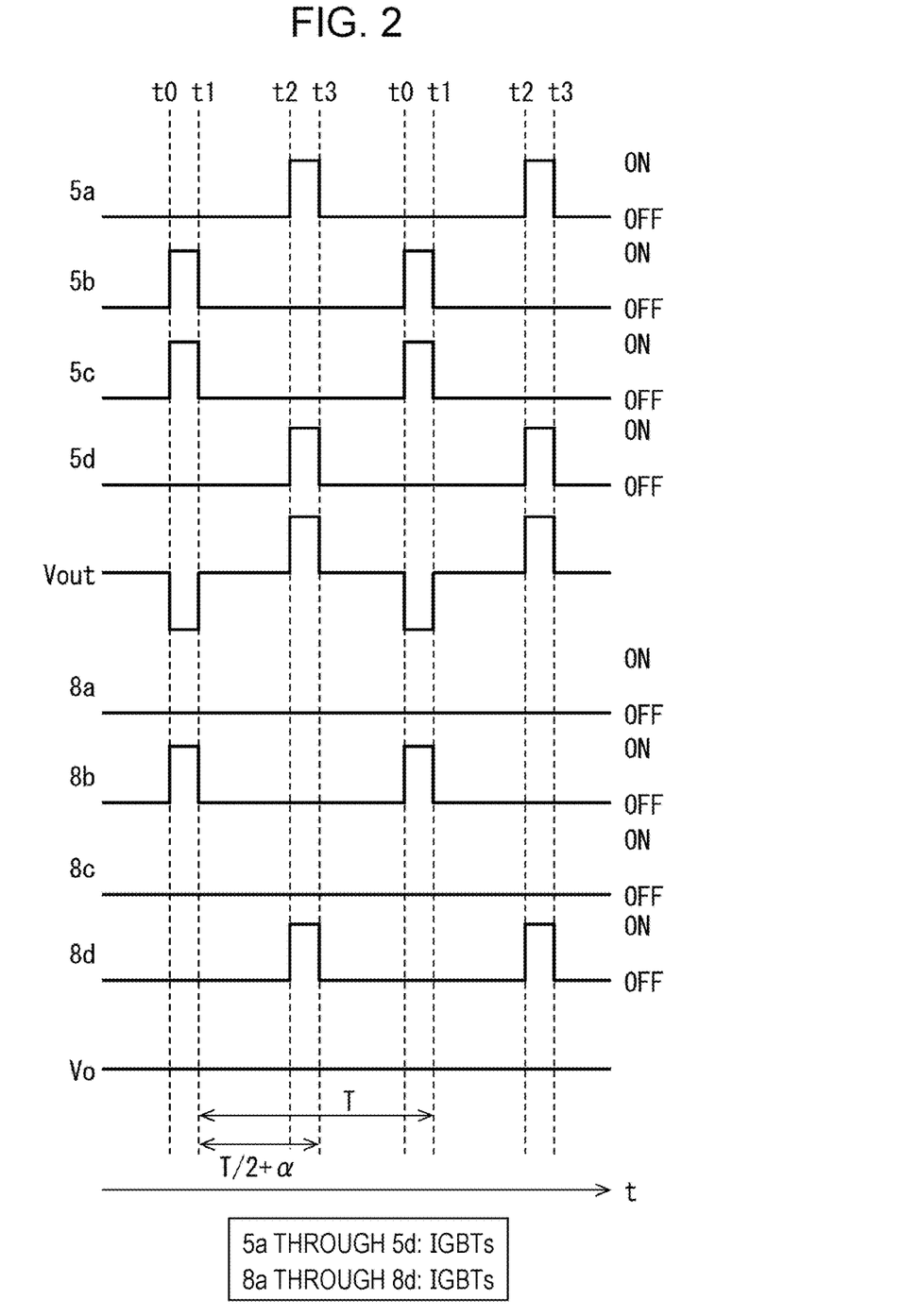
FIG. 2 is a timing chart illustrating the flow of operations of the DC-DC converter according to the reference form of the present invention.

FIG. 2 is a timing chart illustrating the flow of operations of the DC-DC converter CON according to the reference form of the present invention. The control unit 10 synchronously switches the IGBTs 5b, 5c, and 8b at a cycle T, and switches the IGBTs 5a, 5d, and 8d with a predetermined phase difference (a phase difference equivalent to T/2+α in FIG. 2) from the IGBTs 5b, 5c, and 8b.

The aforementioned predetermined phase difference is an offset from 180 degrees by an angle corresponding to approximately ¼ the inverse of resonance frequency. The aforementioned resonance frequency is determined in accordance with the circuit constant of the primary-side converter 100.

When time t is t0<t<t1, the IGBTs 5b and 5c are in an on state as illustrated in FIG. 2, and thus current flows at the primary-side converter 100 in the order of IGBT 5c→primary-side reactor 6→primary winding L1→IGBT 5b. Accordingly, electromotive force is generated at the secondary winding L2, and current flows at the secondary-side converter 200 in the order of IGBT 8b→secondary winding L2→secondary-side reactor 7→IGBT 8c.

When time t is t1<t<t2, all of the IGBTs 5a through 5d and 8a through 8d are in an off state, as illustrated in FIG. 2. However, electromotive force is generated in the direction of maintaining current at the primary-side reactor 6 and secondary-side reactor 7, and electrical vibration is repeated. Accordingly, excitation energy accumulated at the primary-side reactor 6 is regenerated at the input end of the primary-side converter 100, and excitation energy accumulated at the secondary-side reactor 7 is supplied to the output end of the secondary-side converter 200. Regeneration operations are continued at the primary-side converter 100 until the excitation energy at the primary-side reactor 6 reaches zero, and supply operations are continued at the secondary-side converter 200 until the excitation energy at the secondary-side reactor 7 reaches zero.

In a case where the excitation energies at the primary-side reactor 6 and secondary-side reactor 7 are each zero and electrical vibration has subsided at the timing where time t is t=t2, the state is such that voltage Vi/2 is applied across the collector and emitter of each of the IGBTs 5a through 5d, and voltage Vo/2 is applied across the collector and emitter of each of the IGBTs 8a through 8d.

If the IGBTs 5a, 5d, and 8d are turned on in this state, as illustrated in FIG. 2, the charges accumulated in the capacitors 4a, 4d, and 9d respectively connected in parallel to the IGBTs 5a, 5d, and 8d, are consumed by short-circuiting.

In a case where at least one of the excitation energies at the primary-side reactor 6 and secondary-side reactor 7 is not zero at the timing where time t is t=t2, the state is such that voltage of 0 or greater and Vi or smaller is applied across the collector and emitter of each of the IGBTs 5a through 5d, and voltage of 0 or greater and Vo or smaller is applied across the collector and emitter of each of the IGBTs 8a through 8d.

The operations when the time t is t2<t<t3 are the same as when the time t is t0<t<t1 due to the symmetry of the full-bridge circuit, except that the combination of IGBTs to be in an on state differs, and thus description thereof will be omitted.

According to the sequence illustrated in FIG. 2, the switching loss regarding unachieved zero voltage switching in one cycle is half that of a conventional common sequence. Also according to the sequence illustrated in FIG. 2, the count of IGBTs where zero voltage switching is not achieved in one cycle is twice that of a conventional common sequence. As a result, the switching loss per location according to the sequence illustrated in FIG. 2 is ¼ that of a conventional common sequence. Accordingly, the sequence illustrated in FIG. 2 enables local temperature rise due to switching loss to be suppressed as compared to that of a conventional common sequence.

Note that power transmission from the primary-side converter 100 to the secondary-side converter 200 may be switched to power transmission from the secondary-side converter 200 to the primary-side converter 100, by directly switching from the above-described first control to control where control of the primary-side converter 100 and control of the secondary-side converter 200 in the first control are interchanged. Accordingly, the direction of power transmission can be seamlessly switched while keeping switching loss regarding unachieved zero voltage switching low.

Also, α in FIG. 2 ideally is ¼ the inverse of resonance frequency, but there is no need to strictly set α to ¼ the inverse of resonance frequency. It is sufficient to find by experiment, simulation, or the like, a value with which cyclic fluctuation of output power that appears in accordance with increase/decrease of on-duty under light load is smallest, and set the value as α.

Further, the control unit 10 can directly switch from first control to second control, and can directly switch from second control to first control. Description will be made regarding second control below.

Figure 3:
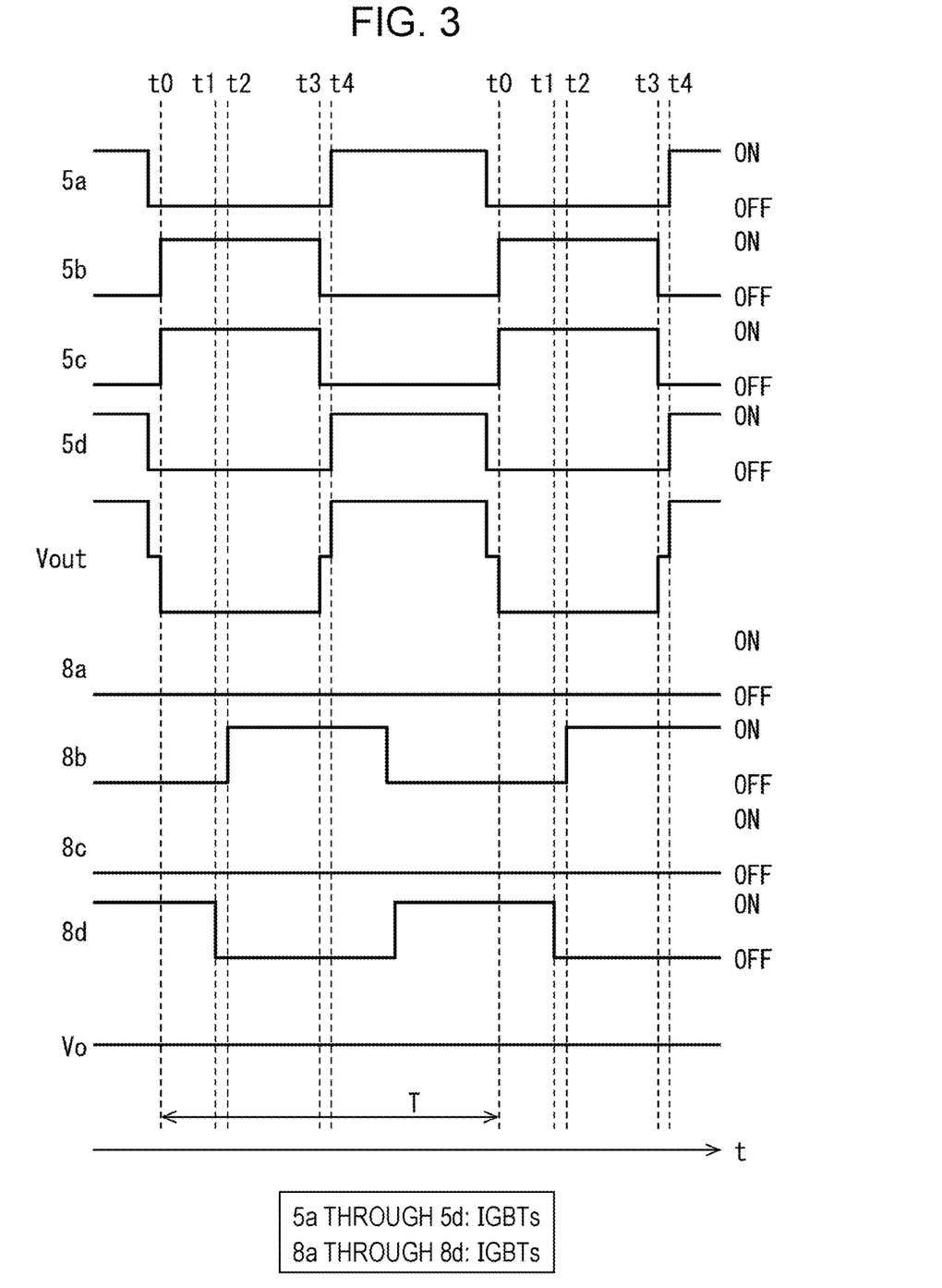
FIG. 3 is a timing chart illustrating another flow of operations of the DC-DC converter according to the reference form of the present invention.

FIG. 3 is a timing chart illustrating another flow of operations of the DC-DC converter CON according to the reference form of the present invention. The control unit 10 complementarily switches on/off the IGBTs 5b and 5c, and the IGBTs 5a and 5d, except for dead time. The on-duty of the IGBTs 5a through 5d is 50%, excluding dead time. The control unit 10 switches the IGBT 8b in phase off the IGBTs 5b and 5c, and switches the IGBT 8d in phase off the IGBTs 5a and 5d. The on-duty of the IGBTs 8b and 8d also is 50%, excluding dead time. In the second control, the control unit 10 adjusts second output power that is output from the secondary-side converter 200, by changing an amount of the phase offset described above.

When time t is t0<t<t1, the IGBTs 5b and 5c are in an on state as illustrated in FIG. 3, and thus current flows at the primary-side converter 100 in the order of IGBT 5c→primary-side reactor 6→primary winding L1→IGBT 5b. Accordingly, electromotive force is generated at the secondary winding L2, and since the IGBT 8d is in an on state as illustrated in FIG. 3, current flows at the secondary-side converter 200 in the order of IGBT 8b→secondary winding L2→secondary-side reactor 7→IGBT 8d.

When time t is t1<t<t3, the IGBT 8d is turned OFF at the timing of time t becoming t=t1, and thereafter the IGBT 8b is turned ON at the timing of time t becoming t=t2. Accordingly, current flows at the secondary-side converter 200 in the order of IGBT 8b→secondary winding L2→secondary-side reactor 7→IGBT 8c. Electromotive force induced by the current flowing over the primary-side converter 100 appears on the secondary winding L2 at this time, and further, the electromotive force at the time of commutation at the secondary-side reactor 7 is built up. Accordingly, the output voltage Vo of the secondary-side converter 200 is boosted.

When time t is t3<t<t4, IGBTs 5a through 5d and 8a and 8c and 8d are in an off state as illustrated in FIG. 3 and the primary-side reactor 6 commutates current, and thus current flows at the primary-side converter 100 in the order of IGBT 5d→primary-side reactor 6→primary winding L1→IGBT 5a. At the secondary-side converter 200, current still continues to flow at the output end of the secondary-side converter 200 by commutation at the secondary-side reactor 7.

The operations when the time t is t4<t are the same as when the time t is t0<t<t4 due to the symmetry of the full-bridge circuit, except that the combination of IGBTs to be in an on state differs, and thus description will be omitted.

In the first control, in a case where on-duty is increased to increase the output power at the secondary-side converter 200, once the on-duty is increased to 50% excluding dead time, the output power of the secondary-side converter 200 cannot be increased beyond that. However, by switching from the first control to the second control, output power of the secondary-side converter 200 can be obtained that is greater than the greatest output power of the secondary-side converter 200 under the first control.

Accordingly, when the on-duty of each switching control executed in the first control reaches approximately 50%, the second control can be started in conjunction with the first control, to switch from the first control to the second control.

Figure 4:
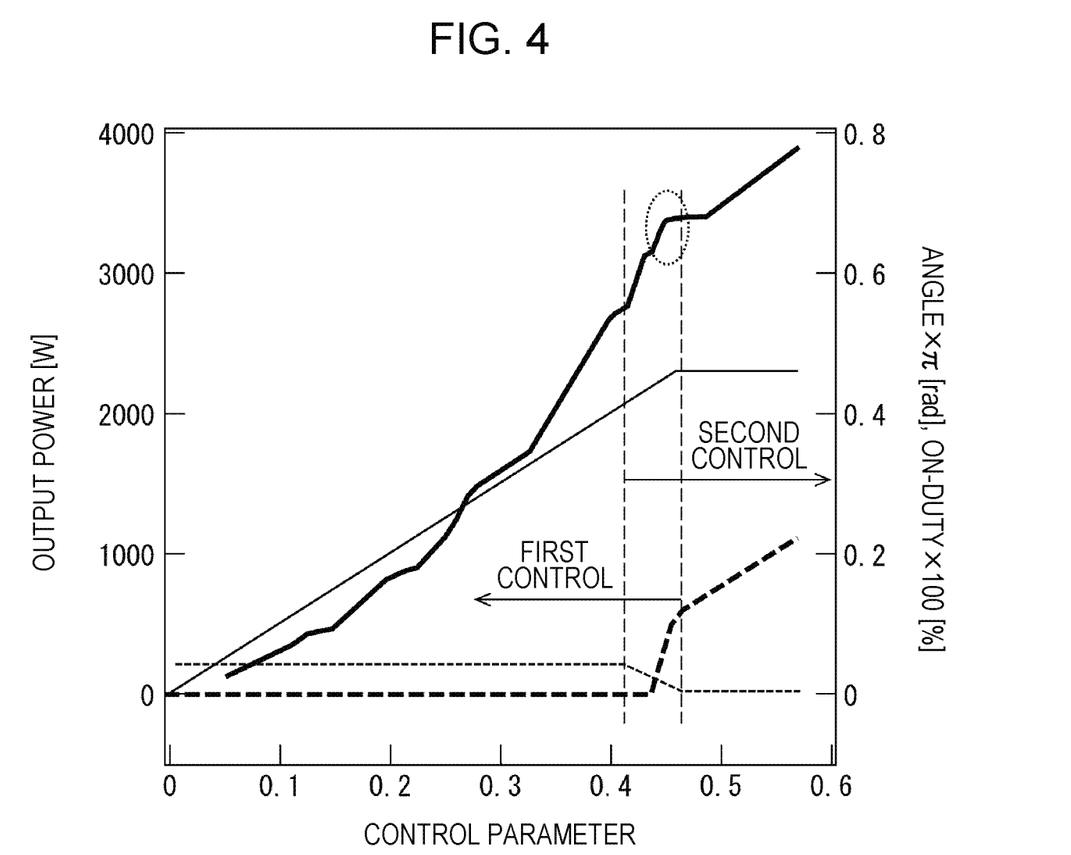
FIG. 4 is a graph illustrating an output power waveform and so forth of the DC-DC converter according to the reference form of the present invention.

FIG. 4 is a graph illustrating an output power waveform and so forth of the DC-DC converter CON according to the reference form of the present invention. The heavy solid line in the graph in FIG. 4 represents the output power of the DC-DC converter CON, and the light solid line represents primary-side on-duty. Also, in this graph, the heavy dashed line represents the above-described phase offset in the second control, and the light dashed line represents the above-described phase offset amount of predetermined phase difference from 180°. Further, a control parameter in this graph is a parameter that the control unit 10 sets in accordance with a target output power.

According to FIG. 4, the control unit 10 performs reduction of the above-described predetermined phase difference and increase of the above-described phase offset in a region where the second control is performed in conjunction with the first control, at the same time in the DC-DC converter CON. This can suppress a drop in output power between the region where the first control is performed and the region where the second control is performed.

That is to say, in a case where increase of the above-described phase offset is started subsequently following completion of reduction of the above-described predetermined phase difference, output power will drop at the control parameter equivalent to a boundary between the completion of reduction and the start of increase and the control parameter near the boundary. As described above, reduction of the above-described predetermined phase difference and increase of the above-described phase offset are performed at the same time, thereby preventing drop in this output power.

Figure 5:
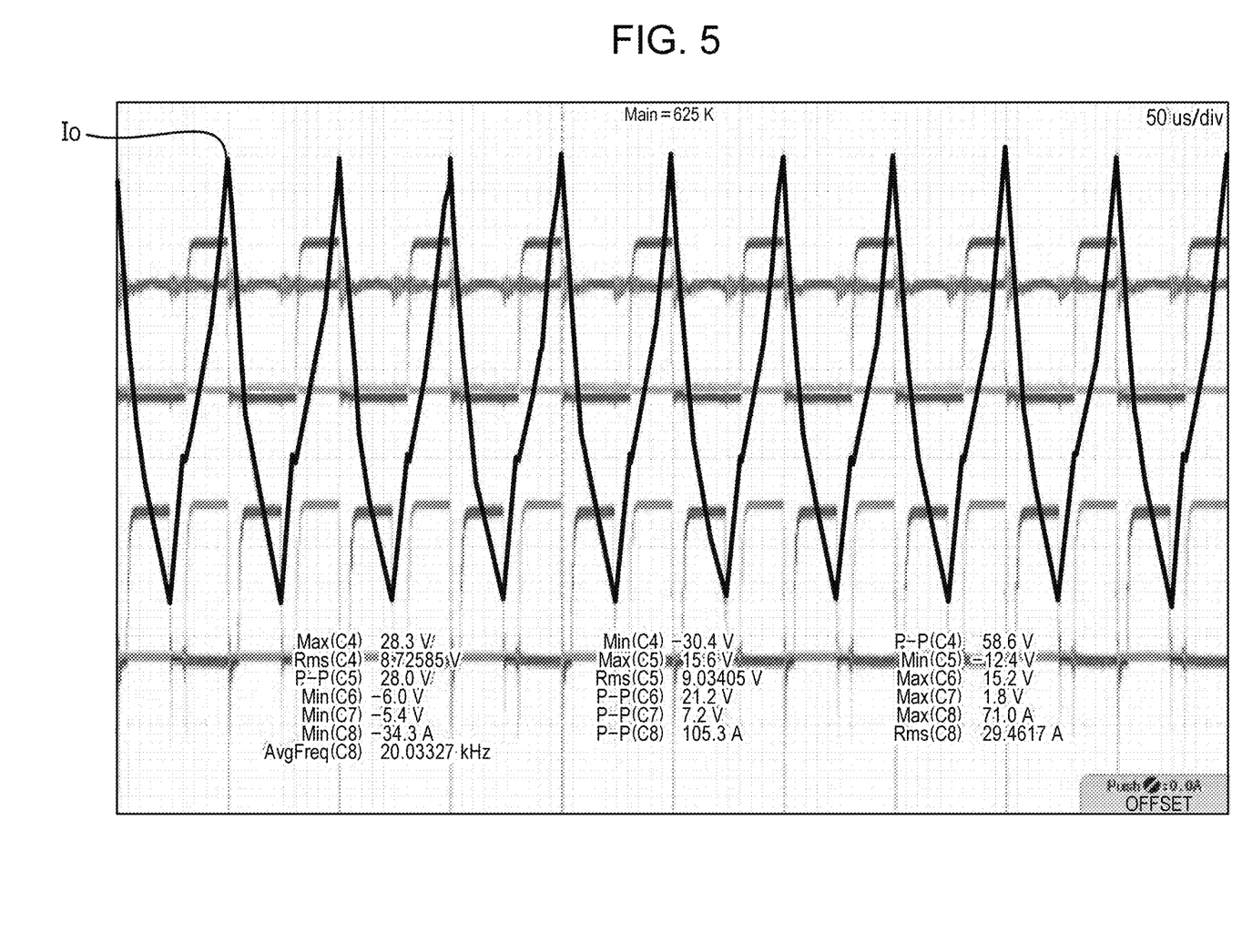
FIG. 5 is a diagram for describing disturbance in an output current waveform at a low output voltage band, according to the reference form of the present invention.

Now, a phenomena was confirmed in which disturbance and noise can occur in the output current waveform of the DC-DC converter CON at a low output voltage band, in a case where control is performed by the control unit 10 based on the output power waveform and so forth of the DC-DC converter CON illustrated in FIG. 4. FIG. 5 is a diagram for describing disturbance in output current waveform at a low output voltage band, according to the reference form of the present invention. The output current waveform Io illustrated in FIG. 5 exhibits abnormally high peaks as this disturbance in the output current waveform. The term low output voltage band as used here typically is a range where voltage Vo is lower than voltage Vi. That is to say, when stepping down is performed using the DC-DC converter CON, this phenomenon can occur under this control.

As a result of diligent study, the inventor of the present application found the following to be a cause of the above-described phenomena occurring. That is to say, when output power is high in a low output voltage band, the above-described predetermined phase difference slightly deviates from 180°, resulting in an unexpectedly great current flowing at the primary-side reactor 6 and/or secondary-side reactor 7. Accordingly, the above-described phenomena occurs as a result of saturation at the primary-side reactor 6 and/or secondary-side reactor 7 where the unexpectedly great current has flowed.

Embodiments of the present invention, in which the above-described phenomena has been overcome, will be described below.

Embodiment 1

The circuit configuration of a DC-DC converter CON1 according to Embodiment 1 of the preset invention is the same as the above-described DC-DC converter CON, and is the same as that illustrated in FIG. 1.

Figure 6:
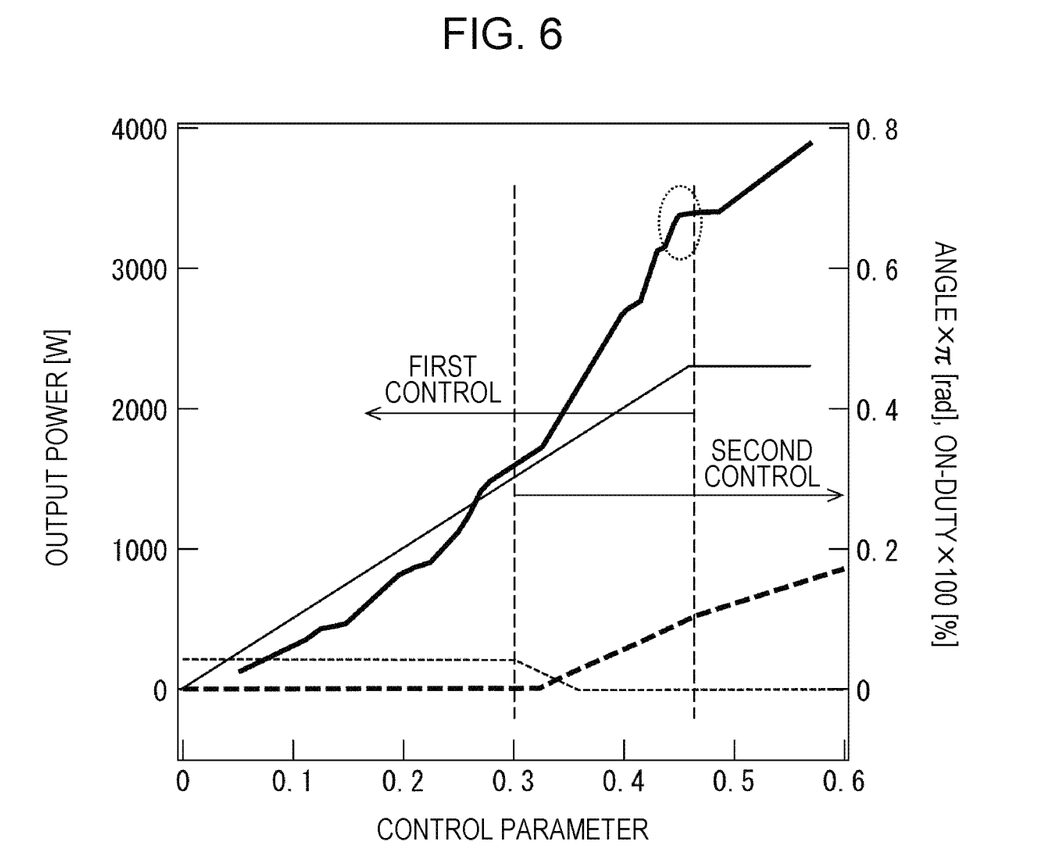
FIG. 6 is a graph illustrating an output power waveform and so forth of the DC-DC converter according to Embodiment 1 of the present invention.

FIG. 6 is a graph illustrating an output power waveform and so forth of the DC-DC converter CON1 according to Embodiment 1 of the present invention. The definitions relating to the graph in FIG. 6 are the same as the definitions relating to the graph in FIG. 4. Regarding voltage Vo, the graph illustrated in FIG. 6 is the same as the graph illustrated in FIG. 4.

The smallest value of the control parameter for performing reduction of the above-described predetermined phase difference is approximately 0.4 in the DC-DC converter CON, as illustrated in FIG. 4. On the other hand, the smallest value of the control parameter for performing reduction of the above-described predetermined phase difference is approximately 0.3 in the DC-DC converter CON1, as illustrated in FIG. 6. The value of output power corresponding to approximately 0.3 for the control parameter is lower than the value of output power corresponding to approximately 0.4 for the control parameter. That is to say, the smallest value of output power at the DC-DC converter CON1 where the reduction of the above-described predetermined phase difference is performed, is lower than the smallest value of output power at the DC-DC converter CON where the reduction of the above-described predetermined phase difference is performed.

In particular, the smallest value of output power at the DC-DC converter CON1 where the reduction of the above-described predetermined phase difference is performed is set to be low, in order to avoid the above-described saturation at the primary-side reactor 6 and/or secondary-side reactor 7 where the unexpectedly great current has flowed. That is to say, this smallest value is lower than power at which the primary-side reactor 6 is saturated by current flowing through the primary-side reactor 6 under the first control and lower than power at which the secondary-side reactor 7 is saturated by current flowing through the secondary-side reactor 7 under the first control, at a desired output voltage under the first control.

Note that the power at which the primary-side reactor 6 is saturated by current flowing at the primary-side reactor 6 under the first control can be confirmed at the stage of manufacturing the DC-DC converter CON1. That is to say, after having configured the circuit of the DC-DC converter CON1, saturation of the primary-side reactor 6 is detected while changing the voltage Vo and output power and so forth by the control unit 10. The output power of the DC-DC converter CON1 when this saturation is detected is identified as being power at which the primary-side reactor 6 is saturated by current flowing at the primary-side reactor 6 under the first control. In the same way, the power at which the secondary-side reactor 7 is saturated by current flowing at the secondary-side reactor 7 under the first control can be confirmed at the stage of manufacturing the DC-DC converter CON1.

The desired output voltage value under the first control described above is determined optionally to some extent in accordance with characteristics and so forth of the DC-DC converter CON1, examples of which can include a value equal to the value of voltage Vi, the smallest value of voltage Vo that the DC-DC converter CON1 can assume, or the like.

Also, simply reducing the smallest value of output power of the DC-DC converter CON1 at which reduction of the above-described predetermined phase difference is performed can result in an unexpected drop in output power of the DC-DC converter CON1 in accordance with reduction of this predetermined phase difference. Accordingly, the smallest value of output power of the DC-DC converter CON1 at which increase of the above-described phase offset is performed preferably is smaller than the smallest value of output power of the DC-DC converter CON at which increase of the above-described phase offset is performed, in order to compensate for this drop in output power. Accordingly, unexpected drop in output power of the DC-DC converter CON1 due to reduction in the above-described predetermined phase difference can be prevented.

According to the DC-DC converter CON1, disturbance in the output current waveform at a low output voltage band can be improved as compared to the DC-DC converter CON. Also, the concern of noise occurring can be reduced in the DC-DC converter CON1 by this improvement. Further, each current flowing at the primary-side reactor 6 and secondary-side reactor 7 is small in the DC-DC converter CON1 as compared to the DC-DC converter CON, and thus inductance of the primary-side reactor 6 and inductance of the secondary-side reactor 7 can be reduced. As a result, lower costs can be realized for the DC-DC converter CON1 as compared to the DC-DC converter CON.

Figure 7:
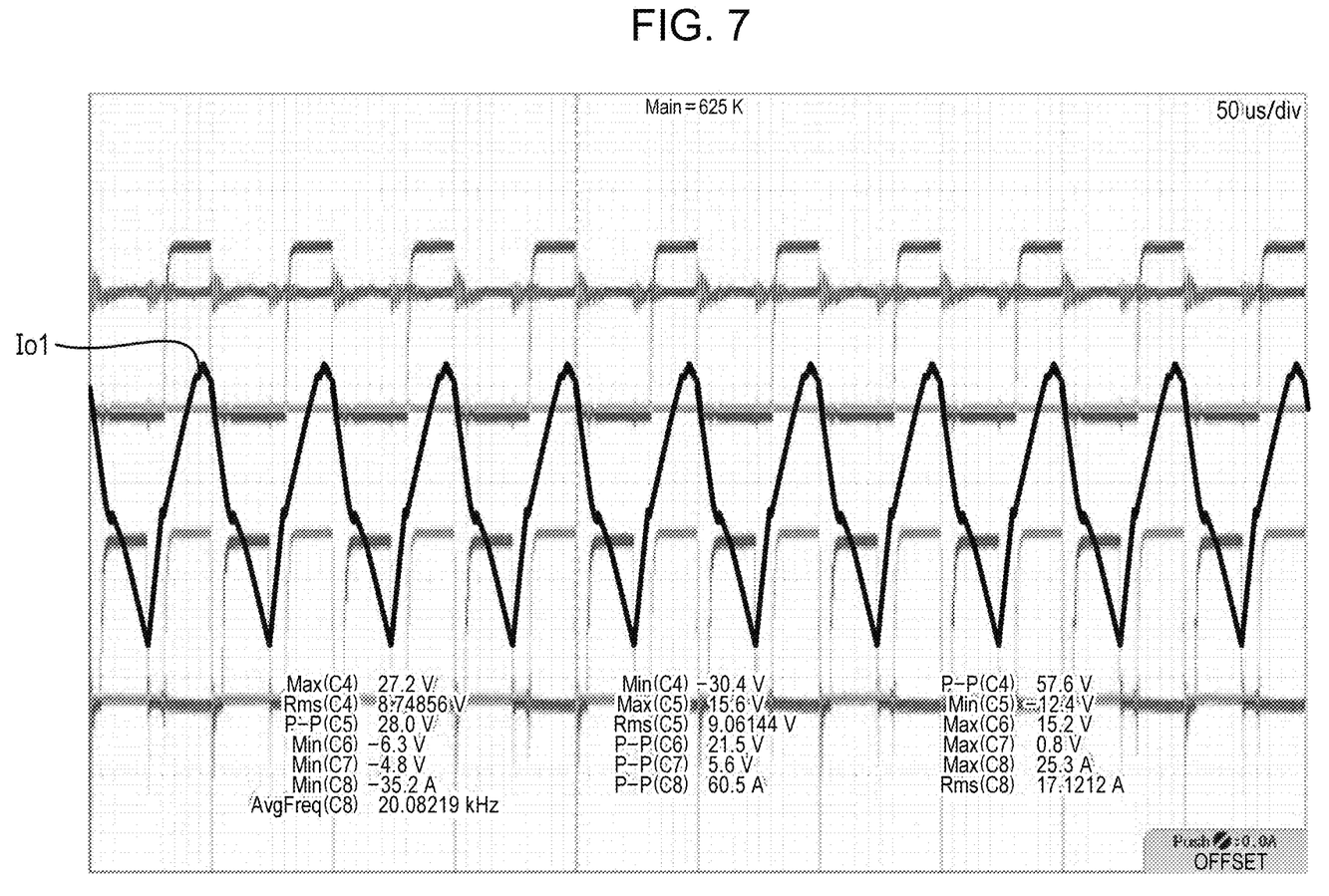
FIG. 7 is a diagram for describing improvement in disturbance in an output current waveform at a low output voltage band, according to Embodiment 1 of the present invention.

FIG. 7 is a diagram for describing improvement in disturbance in an output current waveform at a low output voltage band, according to Embodiment 1 of the present invention. It can be seen from FIG. 7 that disturbance in the output current waveform at a low output voltage band is improved by changing control by the control unit 10 in the DC-DC converter CON to control by the control unit 10 in the DC-DC converter CON1. This is because the conditions in the graph in FIG. 5 and the conditions in the graph in FIG. 7 are the same except that FIG. 5 corresponds to the DC-DC converter CON and FIG. 7 corresponds to the DC-DC converter CON1, and the peaks of output current waveform Io1 illustrated in FIG. 7 are lower in comparison with the peaks of the output current waveform Io illustrated in FIG. 5.

Figure 8:
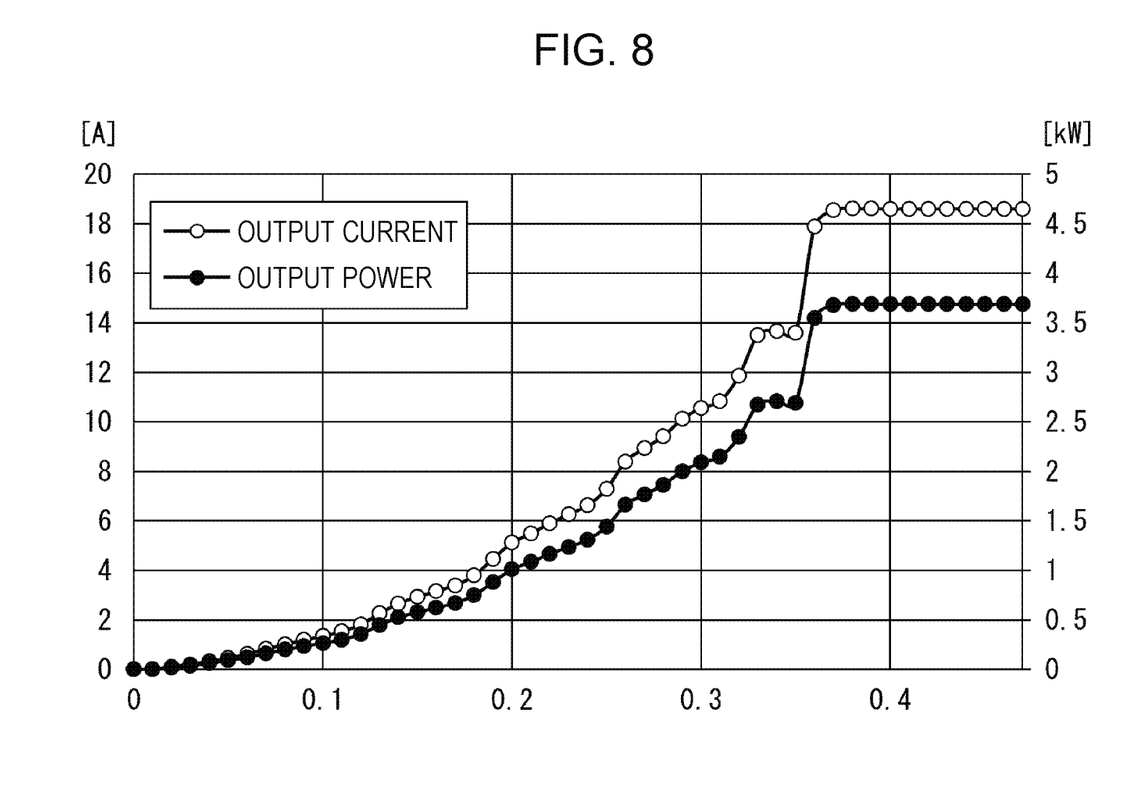
FIG. 8 is a graph illustrating a relation between output power and output current of the DC-DC converter according to Embodiment 1 of the present invention.

FIG. 8 is a graph illustrating a relation between output power and output current of the DC-DC converter CON1 according to Embodiment 1 of the present invention. The horizontal axis in the graph in FIG. 8 indicates the control parameter, the left vertical axis indicates output current (units: A), and the right vertical axis indicates output power (units: kW).

It can be seen from FIG. 8 that there is no drop in output power and/or output current around approximately 0.3 to approximately 0.4 of the control parameter, in addition to the DC-DC converter CON1 obtaining effects equivalent to those of the DC-DC converter CON.

Embodiment 2

The control unit 10 may further perform third control in the DC-DC converter CON1, in the following manner.

Figure 9:
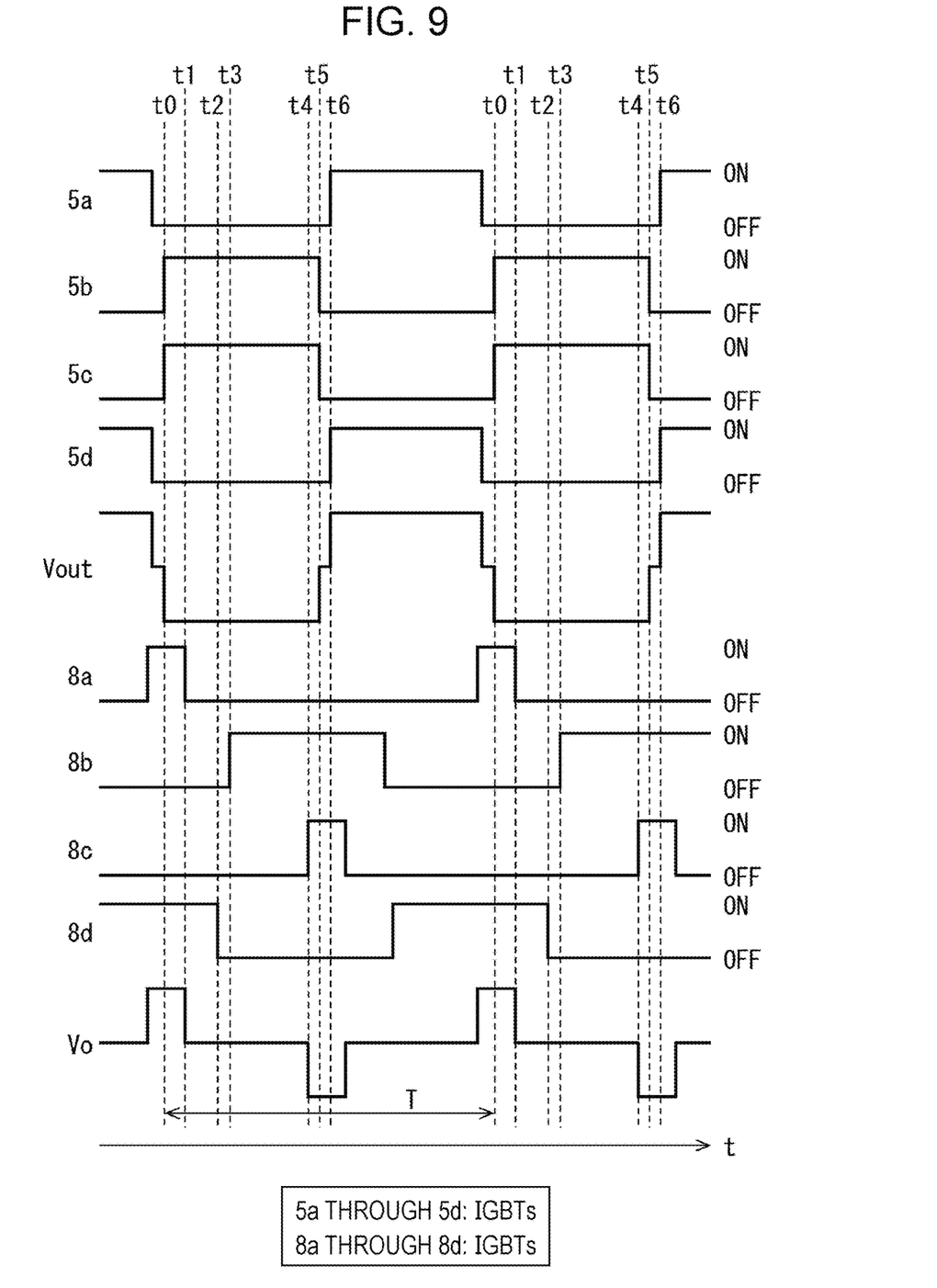
FIG. 9 is a timing chart illustrating yet another flow of operations of the DC-DC converter according to Embodiment 2 of the present invention.

FIG. 9 is a timing chart illustrating yet another flow of operations (i.e., third control) of the DC-DC converter CON1 according to Embodiment 2 of the present invention. The control unit 10 complementarily switches on/off the IGBTs 5b and 5c, and the IGBTs 5a and 5d, except for dead time. The on-duty of the IGBTs 5a through 5d is 50%, excluding dead time. The control unit 10 switches the IGBT 8b in phase by 90° off the IGBTs 5b and 5c, and switches the IGBT 8d in phase by 90° off the IGBTs 5a and 5d. The on-duty of the IGBTs 8b and 8d also is 50%, excluding dead time. The control unit 10 switches the IGBT 8a in phase off the IGBTs 5b and 5c, and switches the IGBT 8c in phase off the IGBTs 5a and 5d. In the third control, the control unit 10 adjusts third output power that is output from the secondary-side converter 200, by changing the on-duty of the IGBTs 8a and 8c.

When time t is t0<t<t1, the IGBTs 5b, 5c, 8a, and 8d are in an on state as illustrated in FIG. 9, and thus current flows at the primary-side converter 100 in the order of IGBT 5c→primary-side reactor 6→primary winding L1→IGBT 5b, and current flows at the secondary-side converter 200 in the order of IGBT 8a→secondary winding L2→secondary-side reactor 7→IGBT 8d. Accordingly, excitation occurs at the primary-side reactor 6 and the secondary-side reactor 7 by both voltage Vi and voltage Vo, and energy is accumulated at the primary-side reactor 6 and secondary-side reactor 7.

The IGBT 8a is turned OFF at the timing of time t becoming t=t1. When time t is t1<t<t2, the IGBT 8a is in an off state, and thus current flows at the secondary-side converter 200 in the order of IGBT 8b→secondary winding L2→secondary-side reactor 7→IGBT 8d, due to the electromotive force occurring at the secondary winding L2. The primary-side reactor 6 is excited by the voltage Vi at the primary-side converter 100, and energy is accumulated at the primary-side reactor 6.

When time t is t2<t<t3, IGBTs 5a and 5d and 8a through 8d are in an off state, as illustrated in FIG. 9. When time t is t3<t<t4, the IGBT 8b is in an on state as illustrated in FIG. 9. Further, when time t is t4<t<t5, the IGBT 8c is in an on state as illustrated in FIG. 9. During all of these periods, i.e., when time t is t2<t<t5, current flows at the secondary-side converter 200 in the order of IGBT 8b→secondary winding L2→secondary-side reactor 7→IGBT 8c. Electromotive force induced by the current flowing over the primary-side converter 100 appears on the secondary winding L2 at this time, and further, the electromotive force at the time of commutation at the secondary-side reactor 7 is built up. Accordingly, voltage Vo is boosted. Note that turning ON of the IGBT 8b at the timing where time t is t=t3, and turning ON of the IGBT 8c at the timing where time t is t=t4, are performed in the commutation period, and thus zero voltage switching is achieved.

When time t is t5<t<t6, the IGBTs 5a through 5d are in an off state as illustrated in FIG. 9, and the primary-side reactor 6 commutates current, and thus current flows at the primary-side converter 100 in the order of IGBT 5d→primary-side reactor 6→primary winding L1→IGBT 5a. At the secondary-side converter 200, current still continues to flow at the output end of the secondary-side converter 200 by commutation at the secondary-side reactor 7.

When the IGBTs 5a and 5d are turned ON at the timing where time t is t=t6, current is flowing at the IGBTs 5a and 5d in the direction from the emitter toward the collector, and thus zero voltage switching is established.

The operations when the time t is t6<t are the same as when the time t is t0<t<t6 due to the symmetry of the full-bridge circuit, except that the combination of IGBTs to be in an on state differs, and thus description will be omitted.

In the second control, when the phase offset amount of the IGBTs 8b and 8d off the IGBTs 5a through 5d is increased in order to increase the output power of the secondary-side converter 200, once the phase offset amount reaches the magnitude of 90 degrees, the output power of the secondary-side converter 200 can be increased no further. The reason is that offsetting the phase beyond 90 degrees lengthens the excitation period of the reactor, and thus a great amount of energy can be accumulated at the reactor, but on the other hand the commutation period for sending out the accumulated energy to the output side becomes shorter, and thus the output power does not increase but rather decreases.

However, directly switching from the second control to the third control enables output power of the secondary-side converter 200, which is greater than the greatest output power of the secondary-side converter 200 under the second control, to be seamlessly obtained.

Accordingly, an arrangement may be made where direct switching is performed from the second control to the third control when the phase offset amount of the IGBTs 8b and 8d off the IGBTs 5a through 5d in the second control reaches 90 degrees.

Note that the output power band of the secondary-side converter 200 under the second control can also be output under the third control as well, and thus direct switching from the second control to third control may be performed before the phase offset amount of the IGBTs 8b and 8d off the IGBTs 5a through 5d reaches 90 degrees in the second control. However, the second control can suppress the peak values of current flowing through the circuit in comparison with the third control. Accordingly, the second control is superior to the third control from the perspective of efficiency, since copper loss can be reduced at parts through which the current passes, and also hysteresis loss can be reduced at magnetic parts. Ripple current is also reduced in the second control as compared to the third control, due to peak current being kept low.

Note that power transmission from the primary-side converter 100 to the secondary-side converter 200 may be switched to power transmission from the secondary-side converter 200 to the primary-side converter 100, by directly switching from the first control to control where control of the primary-side converter 100 and control of the secondary-side converter 200 in the first control are interchanged. Further, an arrangement may be made where the control unit 10 can perform control where control of the primary-side converter 100 and control of the secondary-side converter 200 in each of the second control and third control are interchanged.

Embodiment 3

The following applications can also be made in the DC-DC converter CON1.

For example, while the IGBTs 8a and 8c have been fixed to an off state in the first control and second control, the IGBTs 8b and 8d may be fixed to an off state instead of the IGBTs 8a and 8c.

For example, different transistors such as MOSFETs (metal-oxide-semiconductor field-effect transistors) may be used instead of the IGBTs. Note that in a case where the transmission direction of power is not bidirectional, diodes may be used in the DC-DC converter CON1 instead of IGBTs fixed to an off state.

For example, the above-described predetermined phase difference may be dynamically controlled by the control unit 10, instead of being fixed. In a case where the above-described predetermined phase difference is dynamically controlled by the control unit 10, the above-described predetermined phase difference may be dynamically set in accordance with at least one of (A) on-duty of the IGBTs 5a through 5d, 8b, and 8d, (B) voltage Vi and voltage Vo, and (C) output current of the secondary-side converter 200, for example.

For example, while the IGBT 8a was switched in a state offset by half a cycle (a state with phase offset by 180 degrees) off the IGBT 8c and the IGBT 8b was switched in a state offset by a half cycle (a state with phase offset by 180 degrees) off the IGBT 8d in the third control, any phase offset amount may be used as long as the IGBTs 8a and 8d are not turned on at the same time, and the IGBTs 8b and 8c are not turned on at the same time. The phase offset amount may also be dynamically controlled by the control unit 10 instead of being fixed.

Although the windings of the transformer 1 were the two of primary winding L1 and secondary winding L2 in the DC-DC converter CON1, a multidirectional DC-DC converter may be made where there are three or more windings of the transformer 1, each winding being connected to a full bridge configuration converter, so that all windings can be the input side at one instant and be the output side at another instant, and power transmission between two optional windings is enabled.

SUMMARIZATION

A DC-DC converter according to a first aspect of the present invention includes: a primary-side converter including a primary-side reactor, a plurality of primary-side semiconductor switching devices, and a plurality of primary-side capacitors respectively connected in parallel to the plurality of primary-side semiconductor switching devices; a transformer having a primary winding and a secondary winding; a secondary-side converter including a secondary-side reactor, a plurality of secondary-side semiconductor switching devices, and a plurality of secondary-side capacitors respectively connected in parallel to the plurality of secondary-side semiconductor switching devices; and a control unit that controls the plurality of primary-side semiconductor switching devices and the plurality of secondary-side semiconductor switching devices. The primary-side reactor includes at least one of (1) a coil connected to the primary winding and (2) leakage inductance of the primary winding. The secondary-side reactor includes at least one of (A) a coil connected to the secondary winding and (B) leakage inductance of the secondary winding. The primary-side converter and the secondary-side converter each have a full bridge circuit. When performing a first control of outputting a first output power from the secondary-side converter, the control unit performs switching control where the primary-side semiconductor switching device located at an upper side of a first arm of the primary-side converter and the primary-side semiconductor switching device located at a lower side of a second arm of the primary-side converter match in terms of an on period, performs switching control where the primary-side semiconductor switching device located at the lower side of the first arm of the primary-side converter and the primary-side semiconductor switching device located at the upper side of the second arm of the primary-side converter match in terms of the on period, does not perform switching control of two switching devices located at one of the upper side of first and second arms, and the lower side of the first and second arms, of the secondary-side converter, performs switching control where one of the two secondary-side semiconductor switching devices located at another of the upper side of the first and second arms and the lower side of the first and second arms of the secondary-side converter, and the primary-side semiconductor switching device located at the upper side of the first arm of the primary-side converter and the primary-side semiconductor switching device located at the lower side of the second arm of the primary-side converter, match in terms of the on period, performs switching control where another of the two secondary-side semiconductor switching devices located at another of the upper side of the first and second arms and the lower side of the first and second arms of the secondary-side converter, and the primary-side semiconductor switching device located at the lower side of the first arm of the primary-side converter and the primary-side semiconductor switching device located at the upper side of the second arm of the primary-side converter, match in terms of the on period, and performs switching where the primary-side semiconductor switching device located at the upper side of the first arm of the primary-side converter and the primary-side semiconductor switching device located at the lower side of the first arm of the primary-side converter are switched at a predetermined phase difference. The predetermined phase difference is an offset from 180 degrees by an angle corresponding to approximately ¼ the inverse of resonance frequency. The resonance frequency is determined by the primary-side reactor and the primary-side capacitors. The first output power output from the secondary-side converter is adjusted by changing on-duty of each switching control performed. When performing a second control, the control unit performs switching control where the primary-side semiconductor switching device located at the upper side of the first arm of the primary-side converter and the primary-side semiconductor switching device located at the lower side of the second arm of the primary-side converter match in terms of the on period, performs switching control where the primary-side semiconductor switching device located at the lower side of the first arm of the primary-side converter and the primary-side semiconductor switching device located at the upper side of the second arm of the primary-side converter match in terms of the on period, does not perform switching control of two switching devices located at one of the upper side of the first and second arms, and the lower side of the first and second arms, of the secondary-side converter, performs switching control where the two secondary-side semiconductor switching devices located at another of the upper side of the first and second arms and the lower side of the first and second arms of the secondary-side converter, and the four primary-side semiconductor switching devices of the primary-side converter, are offset in phase in terms of the on period, and adjusts second output power output from the secondary-side converter by the phase offset, with on-duty in each switching control performed being approximately 50%. When starting the second control in conjunction with the first control, the control unit performs reduction of the predetermined phase difference and increase of the phase offset at the same time. A smallest value of output power of the DC-DC converter performing reduction of the predetermined phase difference is lower than power at which the primary-side reactor is saturated by current flowing through the primary-side reactor under the first control and lower than power at which the secondary-side reactor is saturated by current flowing through the secondary-side reactor under the first control, at a desired output voltage under the first control.

According to the above configuration, when a primary-side semiconductor switching device is turned on, charge accumulated at a capacitor connected in parallel to the primary-side semiconductor switching device can be reduced. Accordingly, switching loss when zero voltage switching is not achieved can be reduced. Also, according to this configuration, cyclic fluctuation of output power that appears in accordance with increase/decrease of on-duty under light load can be reduced. Further, according to this configuration, output power of the secondary-side converter that is greater than the greatest output power of the secondary-side converter under the first control can be obtained. Also, drop in output power when switching from the first control to the second control can be suppressed.

Also, according to the above configuration, the primary-side reactor and/or the secondary-side reactor can be prevented from saturating under the first control. Accordingly, disturbance in output current waveform at a low output voltage band can be improved. Also, the concern of noise occurring can be reduced by this improvement. Further, each current flowing at the primary-side reactor and secondary-side reactor is small, and thus inductance of the primary-side reactor and inductance of the secondary-side reactor can be reduced. Consequently, costs can be reduced.

In the above-described first aspect, in a DC-DC converter according to a second aspect of the present invention, the two switching device located at one of the upper side of the first and second arms and the lower side of the first and second arms of the secondary-side converter are the secondary-side semiconductor switching devices, and power transmission from the primary-side converter to the secondary-side converter is switched to power transmission from the secondary-side converter to the primary-side converter, by directly switching from the first control to control where control of the primary-side converter and control of the secondary-side converter in the first control are interchanged.

According to this configuration, the direction of power transmission can be seamlessly switched while keeping switching loss regarding unachieved zero voltage switching low.

In the above-described first or second aspect, in a DC-DC converter according to a third aspect of the present invention, when the on-duty of each switching control executed in the first control reaches approximately 50%, the second control is started in conjunction with the first control.

According to this configuration, simple control switching enables output power of the secondary-side converter, which is greater than the greatest output power of the secondary-side converter under the first control, to be seamlessly obtained.

The present invention is not restricted to the above-described embodiments, and various modifications can be made within the scope set forth in the Claims. Embodiments obtained by appropriate combinations of technical means disclosed in each of the different embodiments are also included in the technical scope of the present invention. Further, new technical features can be formed by combining technical means disclosed in each of the embodiments.

REFERENCE SIGNS LIST

CON1 DC-DC converter
L1 primary winding
L2 secondary winding
1 transformer
4a through 4d capacitors (primary-side capacitors)
5a through 5d IGBTs (primary-side semiconductor switching devices)
6 primary-side reactor
7 secondary-side reactor
8a through 8d IGBTs (secondary-side semiconductor switching devices)
9a through 9d capacitors (secondary-side capacitors)
10 control unit
100 primary-side converter
200 secondary-side converter

The invention claimed is:

1. A DC-DC converter, comprising:
a primary-side converter including a primary-side reactor, a plurality of primary-side semiconductor switching devices, and a plurality of primary-side capacitors respectively connected in parallel to the plurality of primary-side semiconductor switching devices;
a transformer having a primary winding and a secondary winding;
a secondary-side converter including a secondary-side reactor, a plurality of secondary-side semiconductor switching devices, and a plurality of secondary-side capacitors respectively connected in parallel to the plurality of secondary-side semiconductor switching devices; and
a control unit that controls the plurality of primary-side semiconductor switching devices and the plurality of secondary-side semiconductor switching devices,
wherein the primary-side reactor includes at least one of (1) a coil connected to the primary winding and (2) leakage inductance of the primary winding,
wherein the secondary-side reactor includes at least one of (A) a coil connected to the secondary winding and (B) leakage inductance of the secondary winding,
wherein the primary-side converter and the secondary-side converter each have a full bridge circuit,
wherein, when performing a first control of outputting a first output power from the secondary-side converter, the control unit
performs switching control where the primary-side semiconductor switching device located at an upper side of a first arm of the primary-side converter and the primary-side semiconductor switching device located at a lower side of a second arm of the primary-side converter match in terms of an on period,
performs switching control where the primary-side semiconductor switching device located at the lower side of the first arm of the primary-side converter and the primary-side semiconductor switching device located at the upper side of the second arm of the primary-side converter match in terms of the on period,
does not perform switching control of two switching devices located at one of the upper side of first and second arms, and the lower side of the first and second arms, of the secondary-side converter,
performs switching control where one of the two secondary-side semiconductor switching devices located at another of the upper side of the first and second arms and the lower side of the first and second arms of the secondary-side converter, and the primary-side semiconductor switching device located at the upper side of the first arm of the primary-side converter and the primary-side semiconductor switching device located at the lower side of the second arm of the primary-side converter, match in terms of the on period,
performs switching control where another of the two secondary-side semiconductor switching devices located at another of the upper side of the first and second arms and the lower side of the first and second arms of the secondary-side converter, and the primary-side semiconductor switching device located at the lower side of the first arm of the primary-side converter and the primary-side semiconductor switching device located at the upper side of the second arm of the primary-side converter, match in terms of the on period, and
performs switching where the primary-side semiconductor switching device located at the upper side of the first arm of the primary-side converter and the primary-side semiconductor switching device located at the lower side of the first arm of the primary-side converter are switched at a predetermined phase difference,
wherein the predetermined phase difference is an offset from 180 degrees by an angle corresponding to approximately ¼ the inverse of resonance frequency,
wherein the resonance frequency is determined by the primary-side reactor and the primary-side capacitors,
wherein the first output power output from the secondary-side converter is adjusted by changing on-duty of each switching control performed,
wherein, when performing a second control, the control unit
performs switching control where the primary-side semiconductor switching device located at the upper side of the first arm of the primary-side converter and the primary-side semiconductor switching device located at the lower side of the second arm of the primary-side converter match in terms of the on period,
performs switching control where the primary-side semiconductor switching device located at the lower side of the first arm of the primary-side converter and the primary-side semiconductor switching device located at the upper side of the second arm of the primary-side converter match in terms of the on period,
does not perform switching control of two switching devices located at one of the upper side of the first and second arms, and the lower side of the first and second arms, of the secondary-side converter, performs switching control where the two secondary-side semiconductor switching devices located at another of the upper side of the first and second arms and the lower side of the first and second arms of the secondary-side converter, and the four primary-side semiconductor switching devices of the primary-side converter, are offset in phase in terms of the on period, and adjusts second output power output from the secondary-side converter by the phase offset, with on-duty in each switching control performed being approximately 50%, wherein, when starting the second control in conjunction with the first control, the control unit performs reduction of the predetermined phase difference and increase of the phase offset at the same time, and wherein a smallest value of output power of the DC-DC converter performing reduction of the predetermined phase difference is lower than power at which the primary-side reactor is saturated by current flowing through the primary-side reactor under the first control and lower than power at which the secondary-side reactor is saturated by current flowing through the secondary-side reactor under the first control, at a desired output voltage under the first control.

2. The DC-DC converter according to claim 1, wherein the two switching device located at one of the upper side of the first and second arms and the lower side of the first and second arms of the secondary-side converter are the secondary-side semiconductor switching devices, and wherein power transmission from the primary-side converter to the secondary-side converter is switched to power transmission from the secondary-side converter to the primary-side converter, by directly switching from the first control to control where control of the primary-side converter and control of the secondary-side converter in the first control are interchanged.

3. The DC-DC converter according to claim 1, wherein, when the on-duty of each switching control executed in the first control reaches approximately 50%, the second control is started in conjunction with the first control.

* * * * *